US006417984B1

(12) United States Patent
Tamura et al.

(10) Patent No.: US 6,417,984 B1
(45) Date of Patent: Jul. 9, 2002

(54) MAGNETIC RECORDING/REPRODUCTION APPARATUS

(75) Inventors: Kazuya Tamura, Isehara; Naoki Tatsumi; Masahiro Harima, both of Atsugi, all of (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 09/619,781

(22) Filed: Jul. 20, 2000

(30) Foreign Application Priority Data

Aug. 16, 1999  (JP) ............................................ 11-229809

(51) Int. Cl.⁷ ............................................ G11B 15/675
(52) U.S. Cl. ...................................................... 360/96.5
(58) Field of Search ................................. 360/96.5, 96.6

(56) References Cited

U.S. PATENT DOCUMENTS 5,274,523 A  * 12/1993  Tomita et al. ............. 360/96.5
5,742,448 A  *  4/1998  Hamahata et al. ......... 360/96.5

* cited by examiner

Primary Examiner—Robert S. Tupper
(74) Attorney, Agent, or Firm—Ladas & Parry (57) ABSTRACT

A magnetic recording/reproduction apparatus for magnetically recording information to and/or reproducing information from a recording medium, the magnetic recording/reproduction apparatus having an electrically grounded tape cassette loading/ejecting mechanism, the tape cassette loading/ejecting mechanism including a chassis adapted to be electrically grounded, a cassette holder for loading a tape cassette into and/or ejecting a tape cassette from the apparatus, a slider cam assembly mounted on the chassis and mechanically coupled to the cassette holder for moving the cassette holder to and from a predetermined loading position inside the apparatus, and a static electric charge removal mechanism electrically connected to the cassette holder for removing a static electric charge from the cassette holder.

8 Claims, 8 Drawing Sheets

FIG. 8B

MAGNETIC RECORDING/REPRODUCTION APPARATUS

BACKGROUND OF THE INVENTION

1. Field of the Invention

The present invention relates generally to an apparatus for magnetically recording information to and/or reproducing information from a recording medium, and more particularly, to a Digital Audio Tape Recorder, or DAT.

2. Description of the Related Art

One type of apparatus for magnetically recording information to and/or reproducing information from a recording medium, such apparatus hereinafter referred to as a magnetic recording/reproduction apparatus, is a Digital Audio Tape recorder, or DAT.

Figure 1:
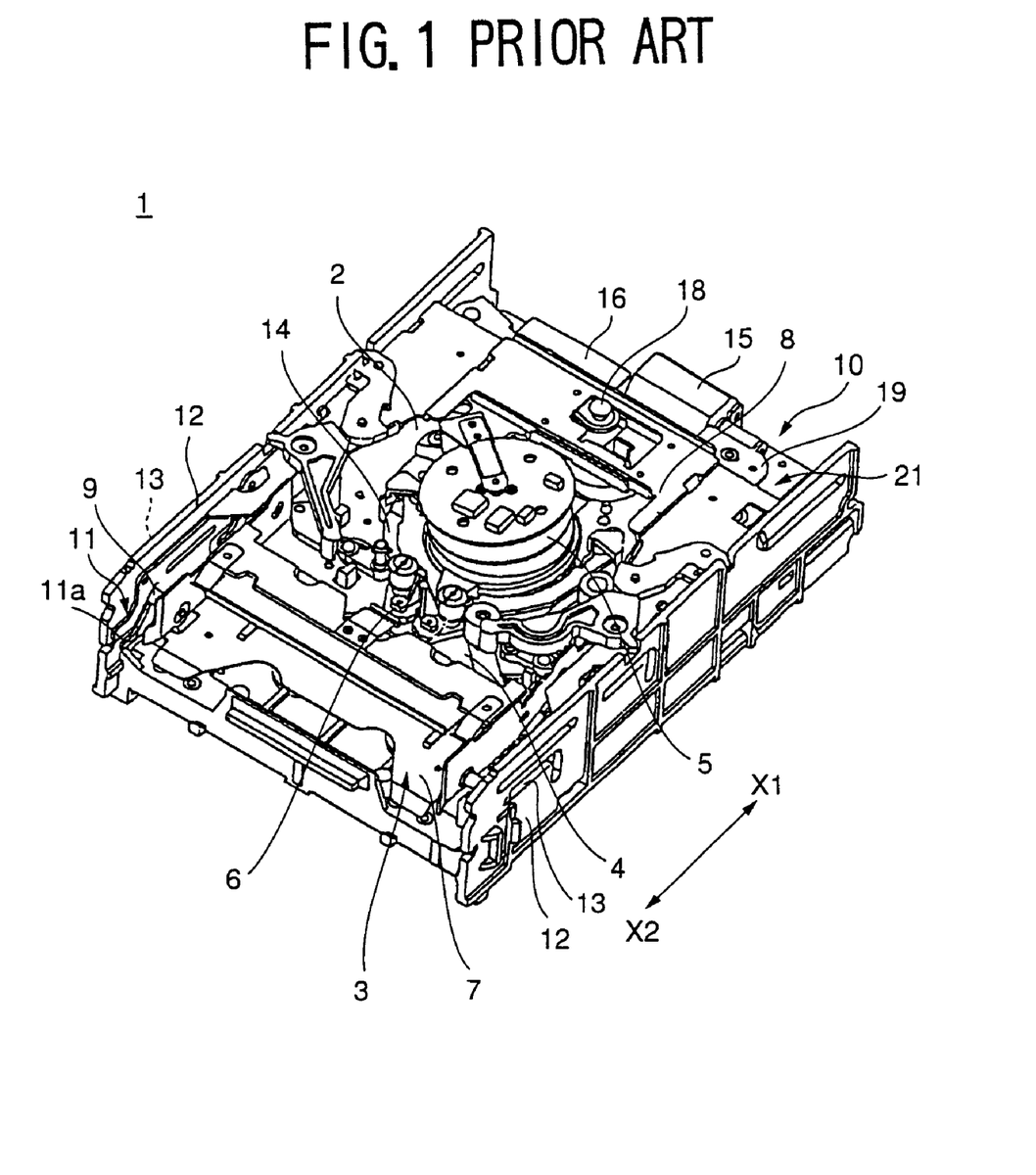
FIG. 1 is perspective view of a conventional magnetic recording/reproduction apparatus.

A conventional DAT 1 is shown in FIG. 1. As shown in the drawing, the DAT 1 mainly comprises a chassis 2, on top of which are provided a variety of mechanisms and components, including a tape cassette loading and ejecting mechanism 3, a reel drive mechanism 4, a rotary cylinder 5 and a tape loading mechanism 6.

The tape cassette loading and ejecting mechanism 3, hereinafter referred to as simply the tape cassette loading mechanism 3, loads a tape cassette (not shown in the diagrams) to a predetermined position within the DAT 1. The tape cassette loading and ejecting mechanism 3 mainly comprises a cassette holder 7 into which the tape cassette is loaded, a slider cam assembly 8 capable of sliding in the X1–X2 direction as indicated in the diagram, and a drive mechanism which, however, is not shown in the diagram. It should be noted that the cassette holder 7, the chassis 2 and the slider cam assembly 8 are made of metal.

The cassette holder 7 and the slider cam assembly 8 are connected by a metal shaft 9 such that as the slider cam assembly 8 moves the cassette holder 7 moves with it.

The movement of the cassette holder 7 is determined by a cam groove 11a of a cam 11 formed on the slider cam assembly 8 together with a substantially L-shaped guide groove 13 formed in a resinous side wall of the chassis. In other words, the drive mechanism causes the slider cam assembly 8 to move in the X1 direction as shown in FIG. 1, which causes the cassette holder 7 to first move horizontally in the X1 direction and then drop downward. By so doing, a tape cassette loaded in the cassette holder 7 is transported to the above-described predetermined position within the apparatus 1 for recording/reproduction. It should be noted that the cam 11 is made of a resinous material to facilitate the sliding of the shaft 9 along the cam 11.

The reel drive mechanism 4 rotatably drives a supply reel and a take-up reel, neither of which is shown in the drawing. Additionally, the magnetic tape (not shown) extracted from the tape cassette is wound around the rotary cylinder 5 at a predetermined angle, with magnetic recording of information to and reproduction of information from the magnetic tape performed as the tape moves. It should be noted that the rotary cylinder 5 is mounted atop a resinous drum base 14. Additionally, the tape loading mechanism 6 extracts the magnetic tape from the tape cassette and winds the magnetic tape around the rotary cylinder 5 at a predetermined angle.

The mode switching mechanism 10 comprises a mode switching gear, a link and a mode switching plate, none of which is shown in the drawing. The mode switching gear is rotatably driven by a mode switching motor 15. It should be noted that reference number 19 in FIG. 1 indicates a motor bracket. Additionally, a circuit board 16 that controls the mode switching motor 15 is provided adjacent to the mode switching motor 15. Additionally, the tape cassette loading mechanism 3 and the tape loading mechanism 6 are connected to the mode switching plate, with the mode switching motor 15 moving the mode switching plate to a plurality of predetermined mode switching positions, thereby accomplishing the mode switching of the apparatus 1.

It should be noted that reference number 21 represents an amplifier assembly comprising an amplifier that amplifies the recording signal and a wiring board that sends the amplified signal to the rotary cylinder 5.

However, the conventional apparatus 1 having the structure described above has a drawback, in that when the tape cassette is loaded to the cassette holder 7 a static electric charge on the tape cassette is transferred to the cassette holder 7. As noted previously, the cam 11 of the slider cam assembly 8 that engages the metal shaft that connects the cassette holder 7 and the slider cam assembly 8 is made of a resinous material in order to facilitate the sliding of the shaft 9 therealong. Moreover, the arm 18 that moves the slider cam assembly 9 is also coated with a resinous material for the same purpose. As a result, the static electricity is not discharged externally via the slider cam assembly 8 but instead remains on the cassette holder 7. The presence of this static electric charge can cause the integrated circuits mounted on the above-described adjacent circuit board to be reset or otherwise operate in a mistaken manner.

At the same time, the conventional apparatus 1 as described above has an additional drawback in that, in the process of loading the tape cassette into the cassette holder 7 and moving the slider cam assembly 8 to a predetermined position directly above the amplifier assembly 21, the slider cam assembly 8 becomes an antenna for radiating electromagnetic waves generated from the wiring board, which can adversely affect the operation of the other electronic components within the apparatus 1. As a result, conventionally the amplifier assembly 21 is covered with a shield casing not shown in the diagram. However, providing such a shield casing requires the use of valuable space in an apparatus having a dense concentration of electronic components, and is therefore undesirable.

SUMMARY OF THE INVENTION

Accordingly, it is a general object of the present invention to provide an improved and useful magnetic recording/reproduction apparatus in which the drawbacks described above are eliminated.

More specifically, a first object of the present invention is to provide an improved and useful magnetic recording/reproduction apparatus in which a static electric charge on the cassette holder is discharged externally and eliminated with the loading of the tape cassette into the cassette holder.

In addition, a second object of the present invention is to provide a magnetic recording/reproduction apparatus in which the slider cam assembly is prevented from acting as an antenna for the radiation of electromagnetic waves generated from the amplifier assembly.

The above-described objects of the present invention are achieved by a magnetic recording/reproduction apparatus for magnetically recording information to and/or reproducing information from a recording medium, the magnetic recording/reproduction apparatus having an electrically grounded tape cassette loading/ejecting mechanism, the tape cassette loading/ejecting mechanism comprising:

a chassis adapted to be electrically grounded;

a cassette holder for loading a tape cassette into and/or ejecting a tape cassette from the apparatus;

a slider cam assembly mounted on the chassis and mechanically coupled to the cassette holder for moving the cassette holder to and from a predetermined loading position inside the apparatus; and a static electric charge removal mechanism electrically connected to the cassette holder for removing a static electric charge from the cassette holder.

According to this aspect of the invention, because the cassette holder is electrically grounded by the ground terminal the static electricity is discharged externally and eliminated not via the chassis when a static electric charge on the tape cassette is transferred to the cassette holder when the tape cassette is loaded into the cassette holder, thus avoiding damage to or interference with the circuit board due to the presence of a static electric charge.

Additionally, the above-described objects of the present invention are also achieved by a magnetic recording/reproduction apparatus for magnetically recording information to and/or reproducing information from a recording medium, the magnetic recording/reproduction apparatus having an electrically grounded tape cassette loading/ejecting mechanism, the tape cassette loading/ejecting mechanism comprising:

a chassis adapted to be electrically grounded mounting an electronic component that generates electromagnetic waves;

a cassette holder for loading a tape cassette into and/or ejecting a tape cassette from the apparatus;

a slider cam assembly mounted on the chassis and mechanically coupled to the cassette holder for moving the cassette holder to and from a predetermined loading position inside the apparatus; and an electromagnetic wave removal mechanism, the electromagnetic wave removal mechanism contacting the slider cam assembly at least when the slider cam assembly has moved the cassette holder to the predetermined loading position inside the apparatus so as to electrically ground the slider cam assembly and cassette holder.

According to this aspect of the invention, when the slider cam assembly has moved to a point directly above the amplifier unit and is exposed to electromagnetic waves generated by the amplifier unit, the slider cam assembly is electrically grounded and thus functions not as an antenna but as a shield casing covering the electronic components, eliminating the adverse effects of noise interference on these electronic components.

Additionally, the above-described objects of the present invention are also achieved by the magnetic recording/reproduction apparatus as described above, wherein the flexible member of the electromagnetic wave removal mechanism has a substantially comb-like shape.

According to this aspect of the invention, each of the individual teeth of the comb-like flexible member flex so as to envelopingly contact the slider cam assembly and thus ground the slider cam assembly securely at multiple points. Additionally, because the slider cam assembly and each of the teeth of the comb-like flexible member form a ground contact, the effectiveness of the ground can be increased by increasing the number of teeth in the comb-like flexible member.

Other objects, features and advantages of the present invention will become more apparent from the following detailed description when read in conjunction with the accompanying drawings.

DESCRIPTION OF THE PREFERRED EMBODIMENTS

A description will now be given of a magnetic recording/reproduction apparatus according to one embodiment of the present invention, with reference to the accompanying drawings. It should be noted that identical or corresponding elements are given identical or corresponding reference numbers in all drawings, with detailed descriptions thereof given once and thereafter omitted. In addition, where relevant, for ease of explanation directions in the drawings are given as X1–X2 for a front-to-back direction, Y1–Y2 for the side-to-side direction, and Z1–Z2 for the vertical direction.

Figure 2:
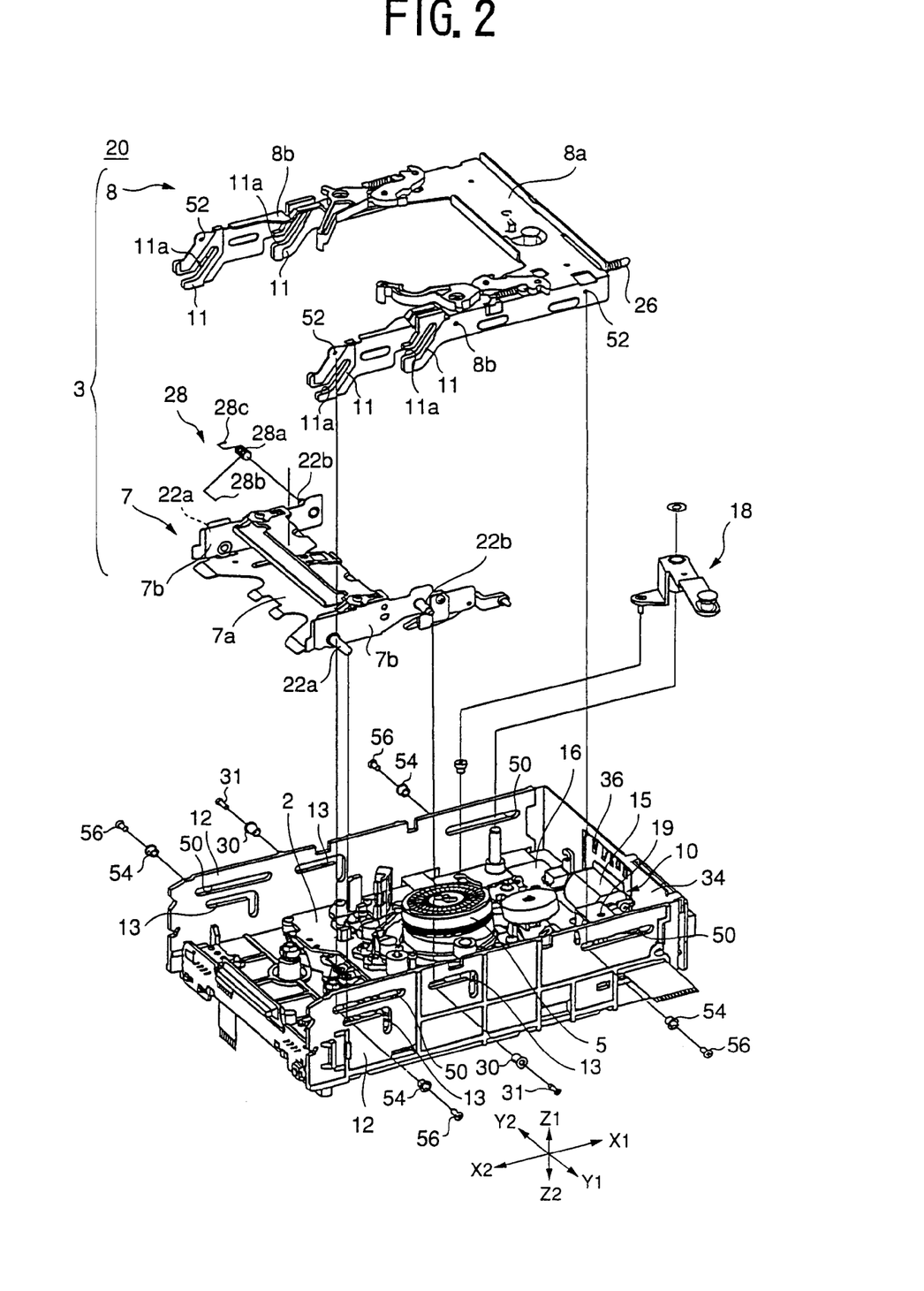
FIG. 2 is a disassembled perspective view of a magnetic recording/reproduction apparatus for explaining a mechanism for removing static electricity and electromagnetic waves according to one embodiment of the present invention.
Figure 3:
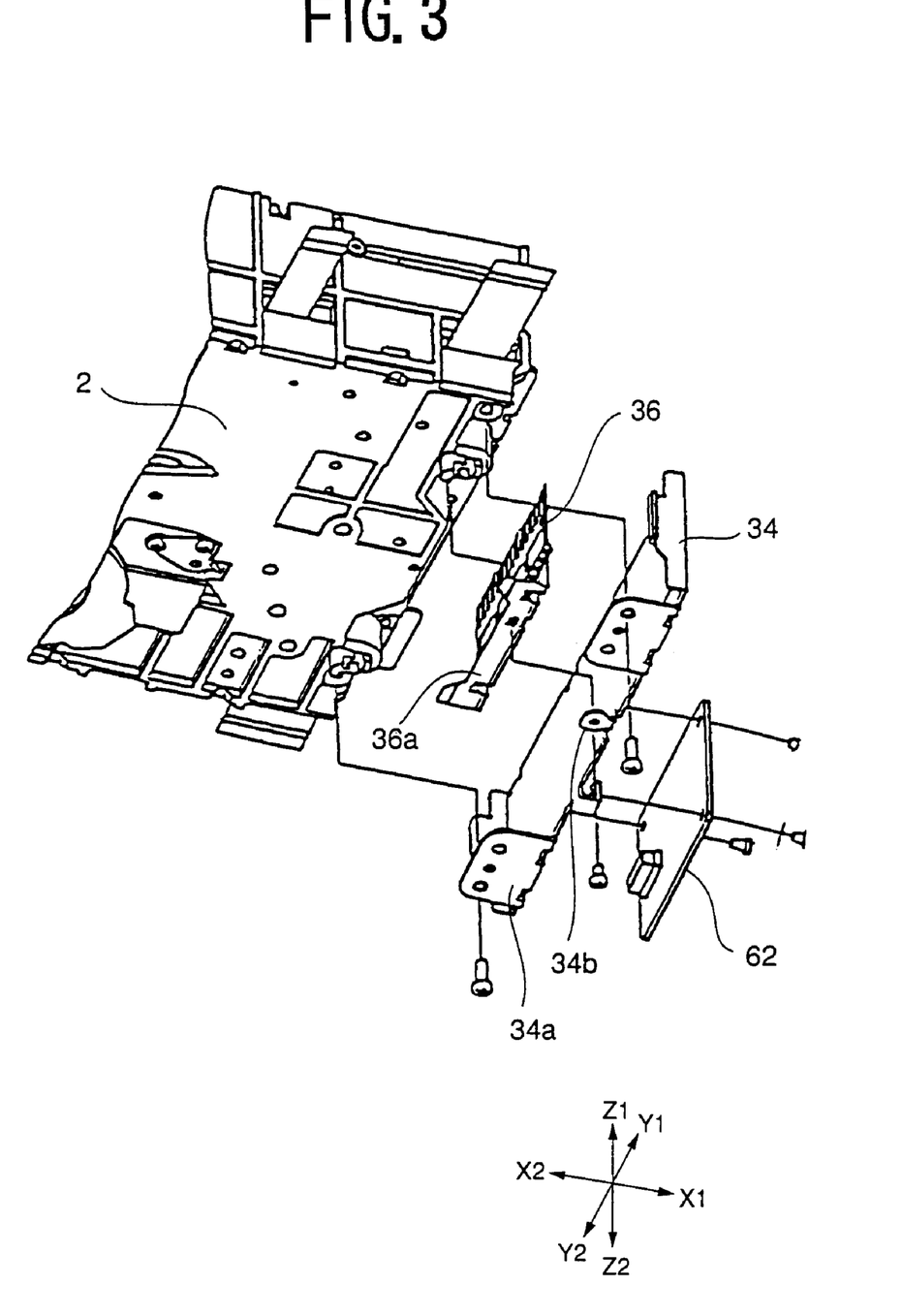
FIG. 3 is a disassembled perspective view from a rear side of the mechanism for removing static electricity and electromagnetic waves shown in FIG. 2.
Figure 4A:
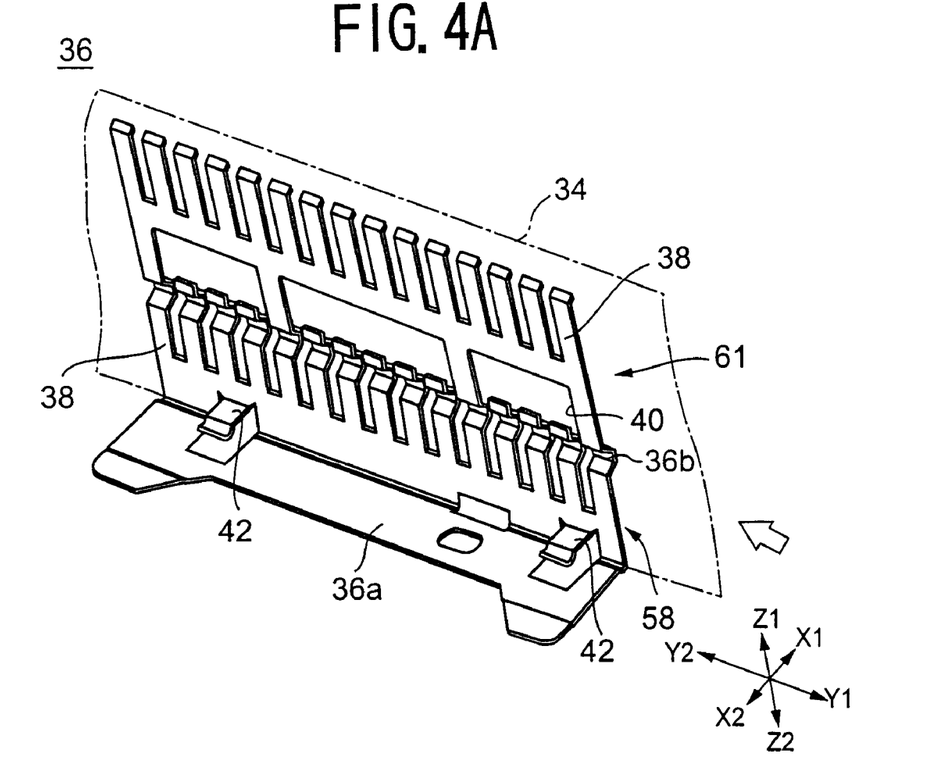
FIGS. 4A and 4B are diagrams showing perspective and edge views of a leaf spring adapted to one embodiment of the present invention.
Figure 4B:
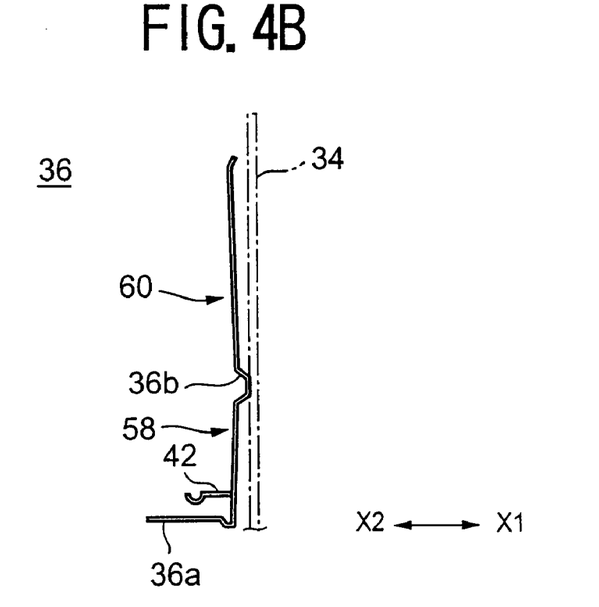
Figure 5A:
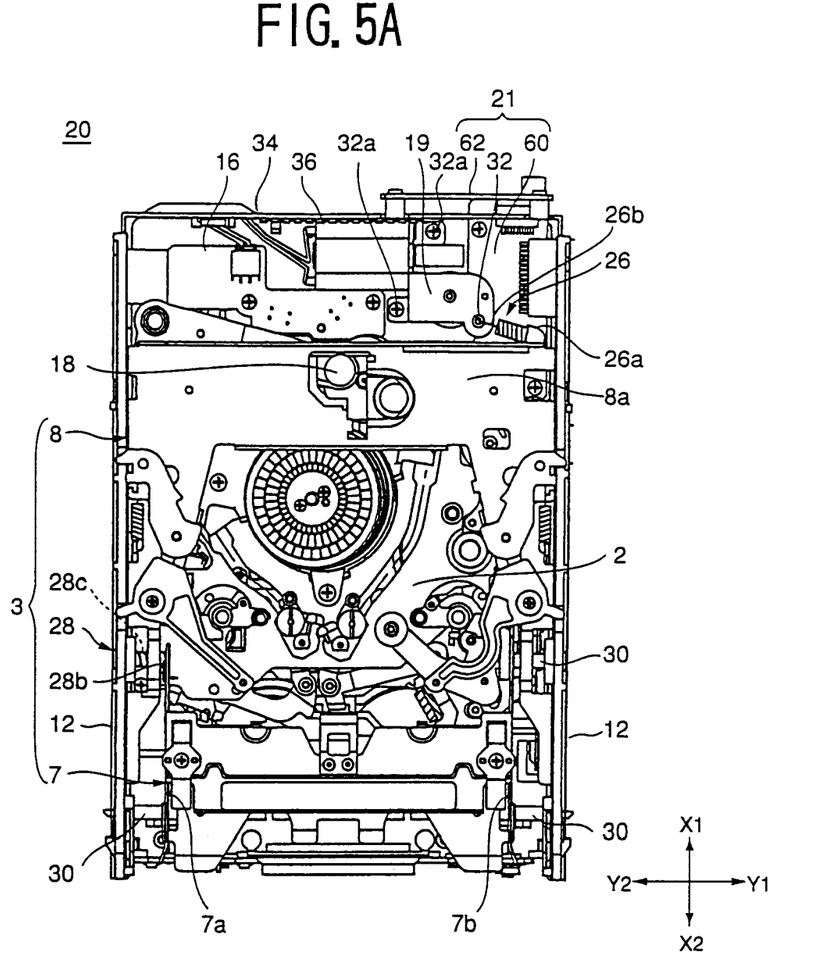
FIGS. 5A and 5B are plan and side views, respectively, of the magnetic recording/reproduction apparatus according to one embodiment of the present invention.
Figure 5B:
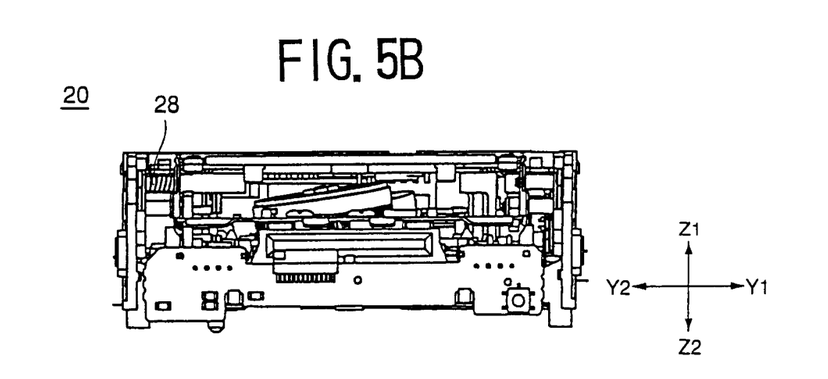

FIG. 2 is a disassembled perspective view of a. magnetic recording/reproduction apparatus for explaining a mechanism for removing static electricity and electromagnetic waves according to one embodiment of the present invention. FIG. 3 is a disassembled perspective view from a rear side of the mechanism for removing static electricity and electromagnetic waves shown in FIG. 2. FIGS. 4A and 4B are diagrams showing perspective and edge views of a leaf spring adapted to one embodiment of the present invention. FIGS. 5A and 5B are plan and side views, respectively, of the magnetic recording/reproduction apparatus according to one embodiment of the present invention.

The magnetic recording/reproduction apparatus 20, hereinafter referred to as the apparatus 20, is substantially similar to the conventional art except for the mechanism for removing static electricity and electromagnetic waves. Accordingly, the following description concentrates on the mechanism for removing static electricity and electromagnetic waves.

As described above, the tape cassette loading mechanism 3 comprises a cassette holder 7 and a slider cam assembly 8, both made of metallic material. The cassette holder 7 has a flat floor panel 7a and side walls 7b on lateral edges in the Y1–Y2 directions. Each of the side walls 7b is provided with a pair of shafts 22a and 22b near front and rear end portions thereof, the shafts being of different heights. Additionally, a threaded portion is provided at a tip of the shafts 22b, such threaded portion not, however, being shown in the drawing.

Additionally, as shown in the diagram, the slider cam assembly 8 comprises a substantially rectangular base portion 8a and a pair of lateral arms 8b extending from the base portion 8a in an X1–X2 direction. Each of the lateral arms 8b is provided with a cam 11 having a cam groove 11a. A coil spring 26 made of conductive metal that acts as a second connecting means is provided on a rear edge base portion 8a. One end 26a of the coil spring 26 is retained by an aperture formed in the base portion 8a.

Further, L-shaped guide grooves 13 for accommodating the slider cam assembly 8,are formed in resinous side walls 12 of the chassis 2.

To install the apparatus 20, one of the shafts 22b of the cassette holder 7 is covered with a coil section 28a of a torsion spring 28 made of a conductive metal that is the first connecting means. Next, the shafts 22a, 22b are fitted to the cam grooves 11a of the cam 11 of the slider cam assembly 8. Then, one end 28b of the torsion spring 28 is engaged to a bottom edge of the side wall 7b of the cassette holder 7 and the other end 28c of the torsion spring 28 is engaged to a top edge of the side wall 8a of the slider cam assembly 8.

Then, in order to mount the cassette holder 7 and the slider cam assembly 8 on the chassis 2, the tips of the shafts 22a, 22b are fitted into the guide grooves 13 in the side walls 12 of the chassis 2, bushings 30 are fitted over the tips of the shaft and screws 31 are fitted to the threaded portions in the tips of the shaft 22b. Additionally, bushings 54 and screws 56 are inserted into straight-line grooves 50 formed toward the rear of the side walls 12, with the screws screwed into hole portions 52 formed in the side walls 8b. It should be noted that both the shafts 22a, 22b and the bushings 30 are made of conductive metal.

Once the apparatus 20 has been mounted, the other end 26b of the coil spring 26 provided on the base portion 8a of the slider cam assembly 8 is retained by a screw 32 provided on the motor bracket 19 and made from a conductive metallic material. It should be noted that the motor bracket 19 is fixedly mounted to the chassis 2 by screws 32 and 32a.

Additionally, a metallic rear wall 34 connected to a ground terminal (not shown in the drawing) is provided at a rear portion of the chassis 2. A leaf spring 36 made of conductive metallic material is mounted so as to contact the rear wall 34 and project in a forward X2 direction.

A more detailed description will now be given of the leaf spring 36, with reference to FIGS. 4A, 4B, 5A and 5B.

A bottom edge of the leaf spring 36 is bent at a right angle and formed into a bottom flange 36a, and mounted to an underside of the chassis 2, toward the rear X1 side of the chassis 2. For convenience, a more detailed description of the mounting of the leaf spring 36 on the chassis will be deferred. Additionally, a bottom edge along both lateral ends of the rear wall 34 of the chassis 2 is similarly bent at a right angle and formed into separate bottom flanges 34a, which are mounted to the underside of the chassis 2 by screws. A separate smaller bottom flange 34b between the bottom flanges 34a is also similarly screwed into the underside of the chassis 2, but with the bottom flange 36a of the leaf spring 36 sandwiched between the bottom flange 34b and the underside of the chassis 2. The effect of this disposition is to securely adapt the leaf spring 36 and the chassis 2 to be electrically grounded via the rear wall 34 of the chassis 2 once the entire unit is inserted into a magnetic recording/reproduction apparatus such as a DAT.

Separately, it should be noted that reference numeral 62 indicates an amplifier unit that is part of the amplifier assembly 21 and which functions to amplify the recording signals. In the present embodiment, the amplifier 62 is positioned outside the rear wall 34, so the amplifier 62 output is fed into the interior of the unit by using a wiring board 60. The amplified recording signals flow through the wiring board 60 and thus the wiring board becomes a source of electromagnetic radiation.

The bottom of the leaf spring 36 is notched in two places to form projections 42. When mounting the leaf spring 36 on the chassis 2, the chassis 2 is slid between the projections 42 and the bottom flange 36a of the leaf spring 36, thus electrically connecting the leaf spring 36 to the chassis 2. The leaf spring 36 further comprises a base portion 58 for fixedly mounted the leaf spring 36 to the chassis 2 and a flexible portion 61 extending vertically from the base portion 58. The flexible portion 61 comprises two parallel rows of comb-like teeth 38 extending laterally Y1–Y2 direction, the rows being formed one substantially atop the other with a large open space 40 between the rows as best seen in FIG. 4A. A projecting portion 36b projecting toward the rear wall 34, that is, toward the X1 direction, is formed at a position in intermediate between the two rows of teeth 38.

A description will now be given of the static electric charge removal mechanism and the electromagnetic wave removal mechanism of the apparatus 20 having the structure described above, in that order.

Figure 6A:
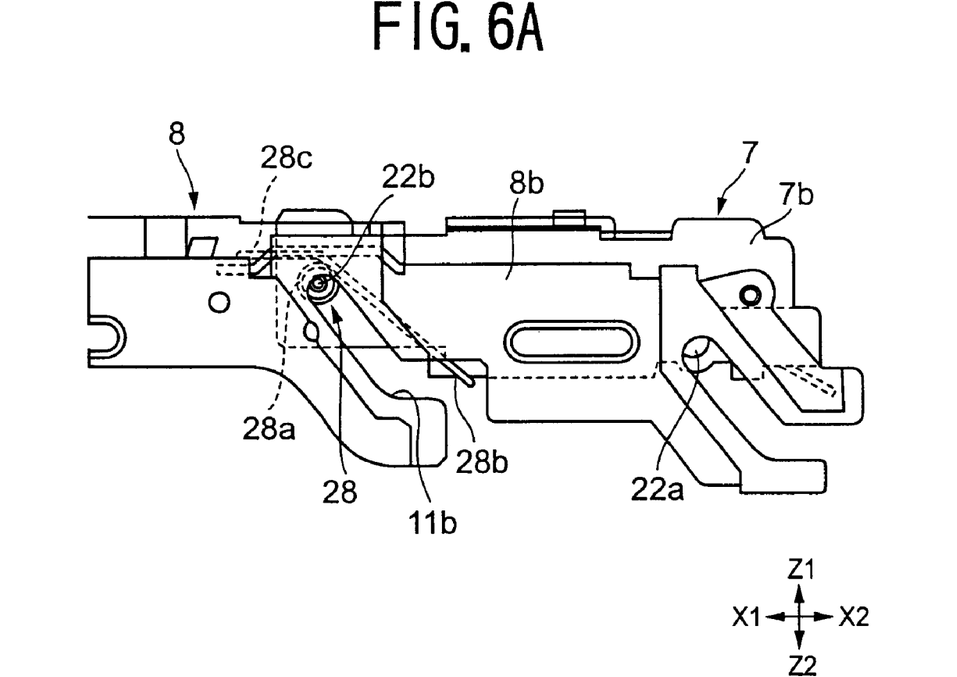
FIGS. 6A and 6B are diagrams for explaining a torsion spring adapted to one embodiment of the present invention, showing left lateral views of a slider cam assembly in an advanced position and a retracted position, respectively.
Figure 6B:
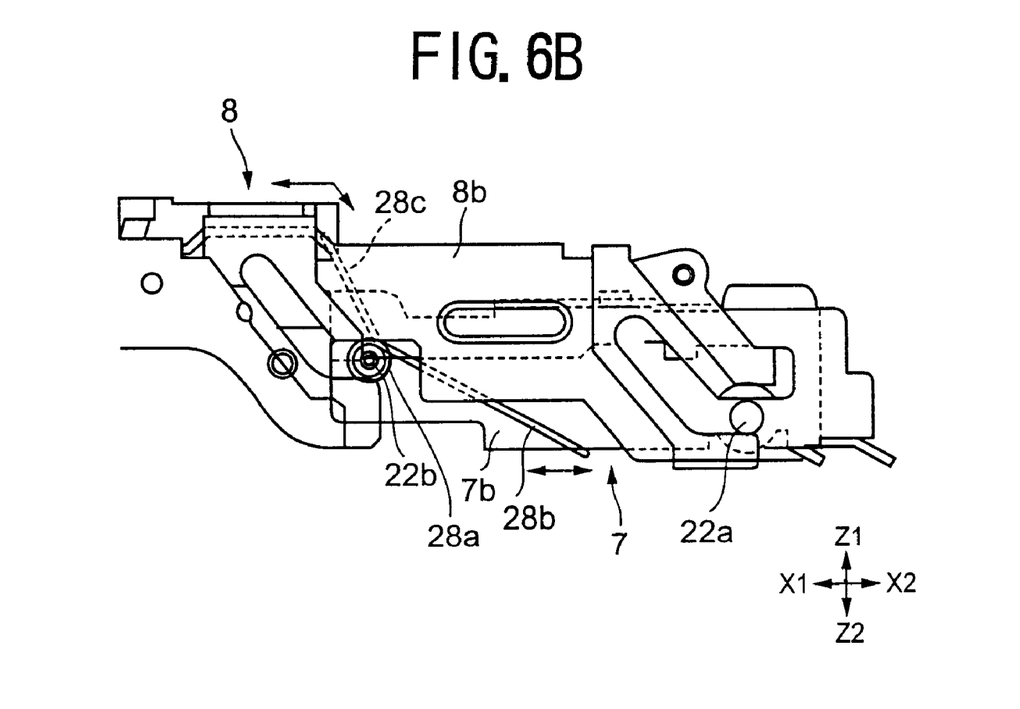
Figure 7A:
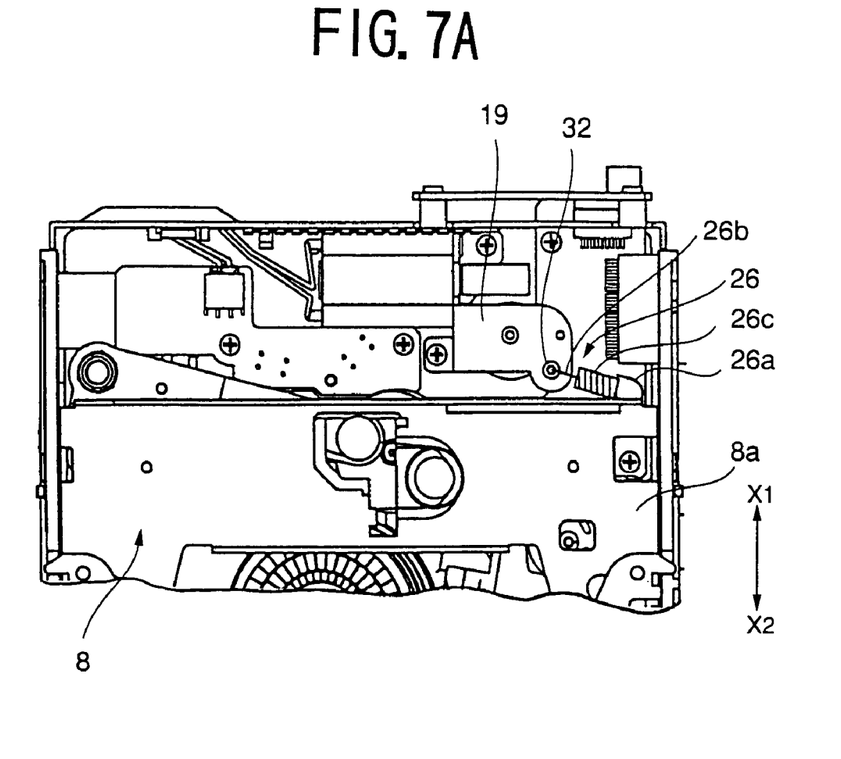
FIGS. 7A and 7B are diagrams for explaining a torsion spring adapted to one embodiment of the present invention, showing partial plan views of a slider cam assembly in an advanced position and a retracted position, respectively.
Figure 7B:
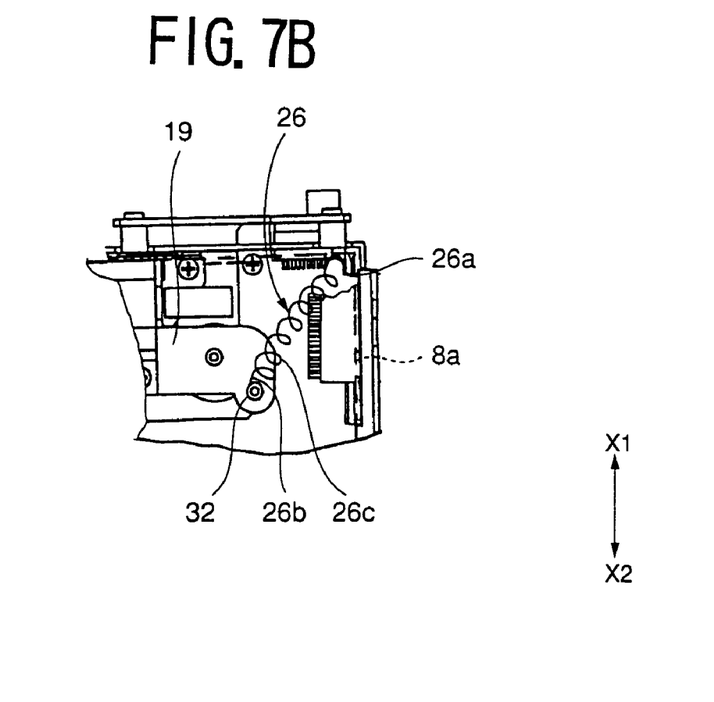

FIGS. 6A and 6B are diagrams for explaining a torsion spring adapted to one embodiment of the present invention, showing left lateral views of a slider cam assembly in an advanced position and a retracted position, respectively. FIGS. 7A and 7B are diagrams for explaining a torsion spring adapted to one embodiment of the present invention, showing partial plan views of a slider cam assembly in an advanced position and a retracted position, respectively.

With the cassette holder 7 and the slider cam assembly 8 in the advanced position shown in FIG. 6A, that is, advanced toward the X2 direction, the shaft 22b advances to an upper end of the slanted portion of the cam groove 11a of the cam 11. At this time the torsion spring 28 is disposed so that one end 28b thereof is engaged by the bottom edge of the side wall 7b of the cassette holder 7 and the other end 28c thereof is engaged by a top edge of the slider cam assembly 8. As a result, the coil portion 28a of the torsion spring wound about the shaft 22b is twisted slightly, thereby producing a spring force.

Similarly, with the cassette holder 7 and the slider cam assembly 8 in the retracted position shown in FIG. 6B, that is, withdrawn toward the X1 direction, the shaft 22b retracts to a straight horizontal portion of the cam groove 11a of the cam 11 and the cassette holder 7 drops downward in the Z2 direction. At this time, the ends 28b, 28c of the torsion spring 28 slide along the their retaining walls, thereby eliminating the tension in the spring and with it the spring force described above.

It should be noted that the coil portion 28a of the torsion spring 28 also functions as a compression spring, with the compression so generated constantly pressing the torsion spring against the walls 7b, 8b of the cassette holder 7 and slider cam assembly 8, respectively.

Accordingly, the torsion spring 28 electrically connects the cassette holder 7 and the slider cam assembly 8. It should be noted that the spring force exerted in the vertical Z1–Z2 direction by the torsion spring 28 is minimal, as is the surface area of contact between the torsion spring 28 and the walls 7b, 8b. As a result, there is not much dust created by friction as the spring slides along the walls. Additionally, though the spring force of the torsion spring 28 in the vertical Z1–Z2 direction is small, as described above the torsion spring exerts a spring force like that of a compression spring in the Y1–Y2 direction, so the torsion spring 28 securely engages the walls 7b, 8b. It should be noted that the ends 28b, 28c of the torsion spring are shaped like hooks and thus can be engaged easily without interfering with the smooth operation of the tape cassette loading mechanism 3.

A description will now be given of the coil spring 26, with reference to FIGS. 7A and 7B.

FIGS. 7A and 7B are diagrams for explaining a torsion spring adapted to one embodiment of the present invention, showing partial plan views of a slider cam assembly in an advanced position and a retracted position, respectively.

As shown in FIG. 7A, the coil portion 26c of the coil spring 26 is compressed when the slider cam assembly 8 is in the advanced position, that is, advanced in the X2 direction. As shown in FIG. 7B, the coil portion 26c of the coil spring 26 is extended when the slider cam assembly 8 is in the retracted position, that is, retracted in the X2 direction. As noted previously, one end 26a of the coil spring 26 is retained by the aperture formed in the base portion 8a of the slider cam assembly 8 and the other end 26b of the coil spring 26 is retained by the screw 32.

The cassette holder 7 and slider cam assembly 8 are constantly in motion when the apparatus 20 is in use, so the slider cam assembly 8 remains electrically connected to the screw 32 via the coil spring 26. As noted previously, the screw 32 is electrically connected to the rear wall 34 via the chassis 2 and from there to the ground terminal.

The static electric charge removal mechanism described above, the cassette holder 7 is connected to the slider cam assembly 8 via the torsion spring 28, the slider cam assembly 8 is connected to the screw 32 on the motor bracket 19 via the coil spring 26, the screw 32 is connected to the chassis 2, the chassis 2 is connected to the rear wall 34, and the rear wall 34 is connected to the ground terminal. As a result, the cassette holder 7 is securely grounded.

Accordingly, even if the cassette holder 7 acquires a static electric charge, that static electric charge is discharged externally, thereby eliminating the noise generated by the static electricity and preventing the circuit board from malfunctioning.

A description will now be given of the electromagnetic wave removal mechanism, with reference to FIGS. 8A and 8B.

Figure 8A:
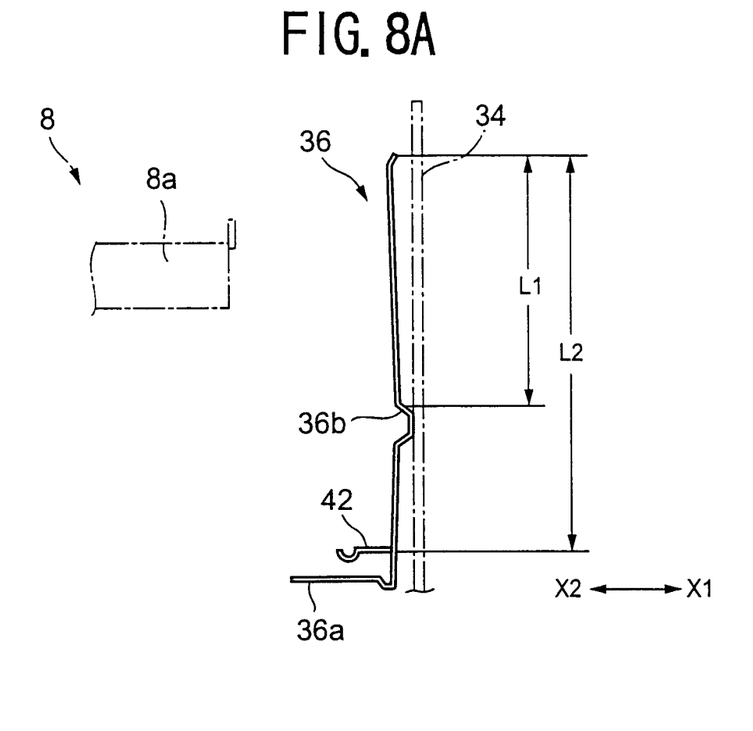
FIGS. 8A and 8B are diagrams for explaining a leaf spring adapted to one embodiment of the present invention, showing right lateral views of a slider cam assembly in an advanced position and a retracted position, respectively.
Figure 8B:
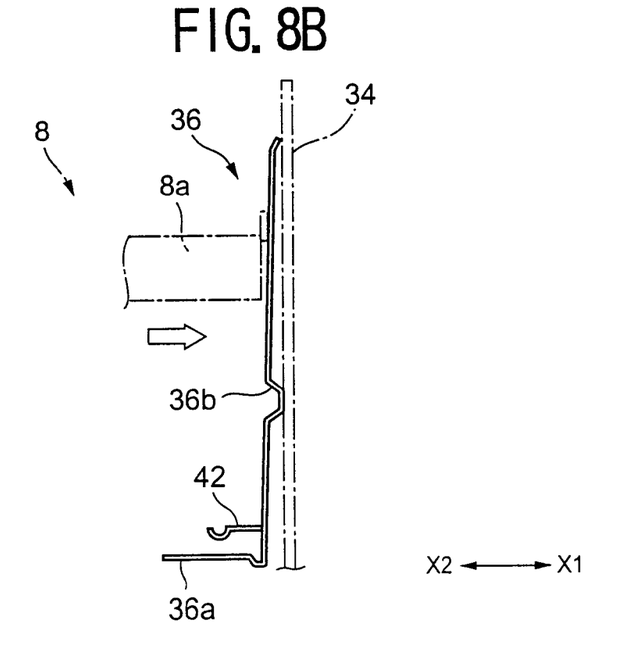

FIGS. 8A and 8B are diagrams for explaining a leaf spring adapted to one embodiment of the present invention, showing right lateral views of a slider cam assembly in an advanced position and a retracted position, respectively.

As shown in FIG. 8A, the leaf spring 36 and a rear end of the base portion 8a of the slider cam assembly 8 are separated from each other when the slider cam assembly 8 is in the advanced position, that is, advanced in the X2 direction. In this case, the slider cam assembly 8 is separated also from the wiring board 60 that carries the amplifier assembly 21 that generates electromagnetic waves, so there is no possibility that the slider cam assembly 8 becomes an antenna for the propagation of electromagnetic waves from the wiring board 60.

However, when the slider cam assembly 8 is in a retracted position as shown in FIG. 8B, that is, retracted in the X1 direction, a rear end of the base portion 8a of the slider cam assembly 8 contacts the leaf spring 36 and a projecting portion 36b contacts a rear wall 34. The projecting portion 36b so positioned thus formed a fixed end and generates a spring force.

When the slider cam assembly 8 is retracted and the base portion 8a of the slider cam assembly 8 is directly above the wiring board 60 as described above and the base portion of the slider cam assembly 8 contacts the leaf spring 36, the bottom flange 36a of the leaf spring 36 is electrically connected to the ground terminally that is connected to the rear wall 34 via the bottom flanges 34a of the rear wall 34. Accordingly, the slider cam assembly 8 does not act as a radiating antenna for the propagation of electromagnetic waves from the wiring board 60 but instead acts as a shield casing for the wiring board 60 and blocking the radiation of electromagnetic waves therefrom.

Additionally, as can be appreciated from the diagrams, a length L2 of substantially the entire leaf spring 36 is greater than a length L1 of the upper part of the leaf spring 36, so the spring constant is increased and the spring force of the leaf spring 36 as a whole is enhanced, thereby improving the contact between the rear. end of the base portion 8a and the leaf spring 36.

Additionally, the teeth 38 of the slider cam assembly 8 leaf spring 36 are by definition individually formed and can therefore bend independently to accommodate the rear end of the base portion 8a of the slider cam assembly 8 even if the base portion 8a contacts the leaf spring 36 not cleanly but at an angle to the leaf spring 36. The practical effect is that the electrical grounding of the slider cam assembly 8 is improved.

The above description is provided in order to enable any person skilled in the art to make and use the invention and sets forth the best mode contemplated by the inventors of carrying out the invention.

The present invention is not limited to the specifically disclosed embodiments and variations, and modifications may be made without departing from the scope and spirit of the present invention.

The present application is based on Japanese Priority Application No. 11-229809, filed on Aug. 16, 1999, the entire contents of which are hereby incorporated by reference.

What is claimed is:

1. A magnetic recording/reproduction apparatus for magnetically recording information to and/or reproducing information from a recording medium, the magnetic recording/reproduction apparatus having an electrically grounded tape cassette loading/ejecting mechanism, the tape cassette loading/ejecting mechanism comprising:

a chassis adapted to be electrically grounded;

a cassette holder for loading a tape cassette into and/or ejecting a tape cassette from the apparatus;

a slider cam assembly mounted on the chassis and mechanically coupled to the cassette holder for moving the cassette holder to and from a predetermined loading position inside the apparatus; and static electric charge removal means electrically connected to the cassette holder for discharging a static electric charge from the cassette holder to the chassis via the slider cam assembly.

2. The magnetic recording/reproduction apparatus as claimed in claim 1, wherein the static electric charge removal mechanism comprises:

first connecting means electrically connecting the cassette holder and the slider cam assembly; and second connecting means electrically connecting the slider cam assembly to the chassis.

3. The magnetic recording/reproduction apparatus as claimed in claim 2, wherein:

the first connecting means of the static electric charge removal mechanism comprises a torsion spring; and the second connecting means of the static electric charge removal mechanism comprises a coil spring.

4. The magnetic recording/reproduction apparatus as claimed in claim 3, wherein:

a shaft is provided on the cassette holder; and the slider cam assembly is provided with a cam, the shaft engaging the cam, the torsion spring constructed so that a coil portion thereof is wound longitudinally about the shaft, one end of the torsion spring being retained by the cassette holder, the other end of the torsion spring being retained by the cam assembly.

5. A magnetic recording/reproduction apparatus for magnetically recording information to and/or reproducing information from a recording medium, the magnetic recording/reproduction apparatus having an electrically grounded tape cassette loading/ejecting mechanism, the tape cassette loading/ejecting mechanism comprising:

a chassis adapted to be electrically grounded and mounting an electronic component that generates electromagnetic waves;

a cassette holder for loading a tape cassette into and/or ejecting a tape cassette from the apparatus;

a slider cam assembly mounted on the chassis and mechanically coupled to the cassette holder for moving the cassette holder to and from a predetermined loading position inside the apparatus; and electromagnetic wave removal means for contacting the slider cam assembly only when the slider cam assembly has moved the cassette holder to the predetermined loading position inside the apparatus so as to electrically ground the cassette holder via the slider cam assembly.

6. The magnetic recording/reproduction apparatus as claimed in claim 5, wherein the electromagnetic wave removal mechanism comprises a leaf spring assembly, the leaf spring assembly comprising:

a fixed member fixedly mounted atop the chassis; and a flexible member extending vertically from the fixed member so that the flexible member contacts the slider cam assembly only when the slider cam assembly has moved the cassette holder to the predetermined loading position.

7. The magnetic recording/reproduction apparatus as claimed in claim 6, the electromagnetic wave removal mechanism further comprising:

a rear wall provided on a rear edge of the chassis; and a projecting member provided between the fixed member and the flexible member of the leaf spring assembly and projecting rearward toward the rear wall of the chassis.

8. The magnetic recording/reproduction apparatus as claimed in claim 6, wherein the flexible member of the electromagnetic wave removal mechanism has a substantially comb-like shape.

* * * * *